Jan. 26, 1937.  R. B. RESPESS  2,068,870
DIRIGIBLE
Filed April 8, 1932  9 Sheets-Sheet 1

Roland B Respess
INVENTOR.

Jan. 26, 1937. R. B. RESPESS 2,068,870
DIRIGIBLE
Filed April 8, 1932 9 Sheets-Sheet 2

Roland B. Respess
INVENTOR.

Jan. 26, 1937.    R. B. RESPESS    2,068,870
DIRIGIBLE
Filed April 8, 1932    9 Sheets-Sheet 3

Roland B Respess
INVENTOR.

Jan. 26, 1937.    R. B. RESPESS    2,068,870
DIRIGIBLE
Filed April 8, 1932    9 Sheets-Sheet 4

Roland B. Respess
INVENTOR.

Roland B Respess
INVENTOR.

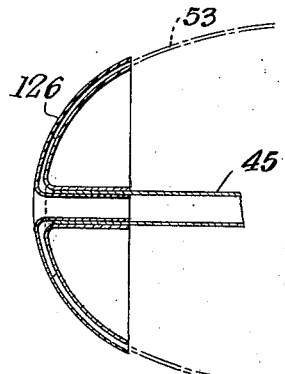
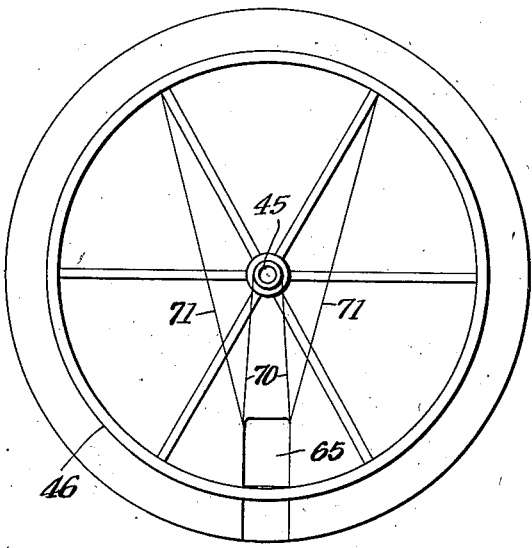
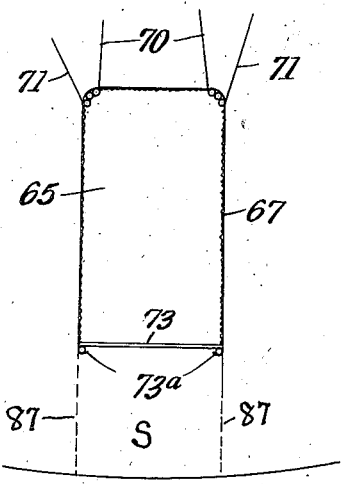
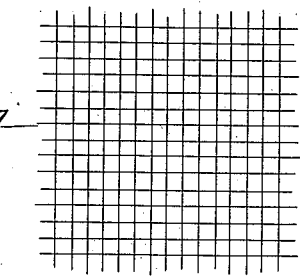
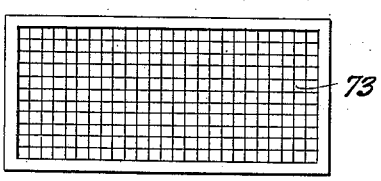
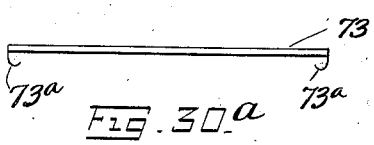

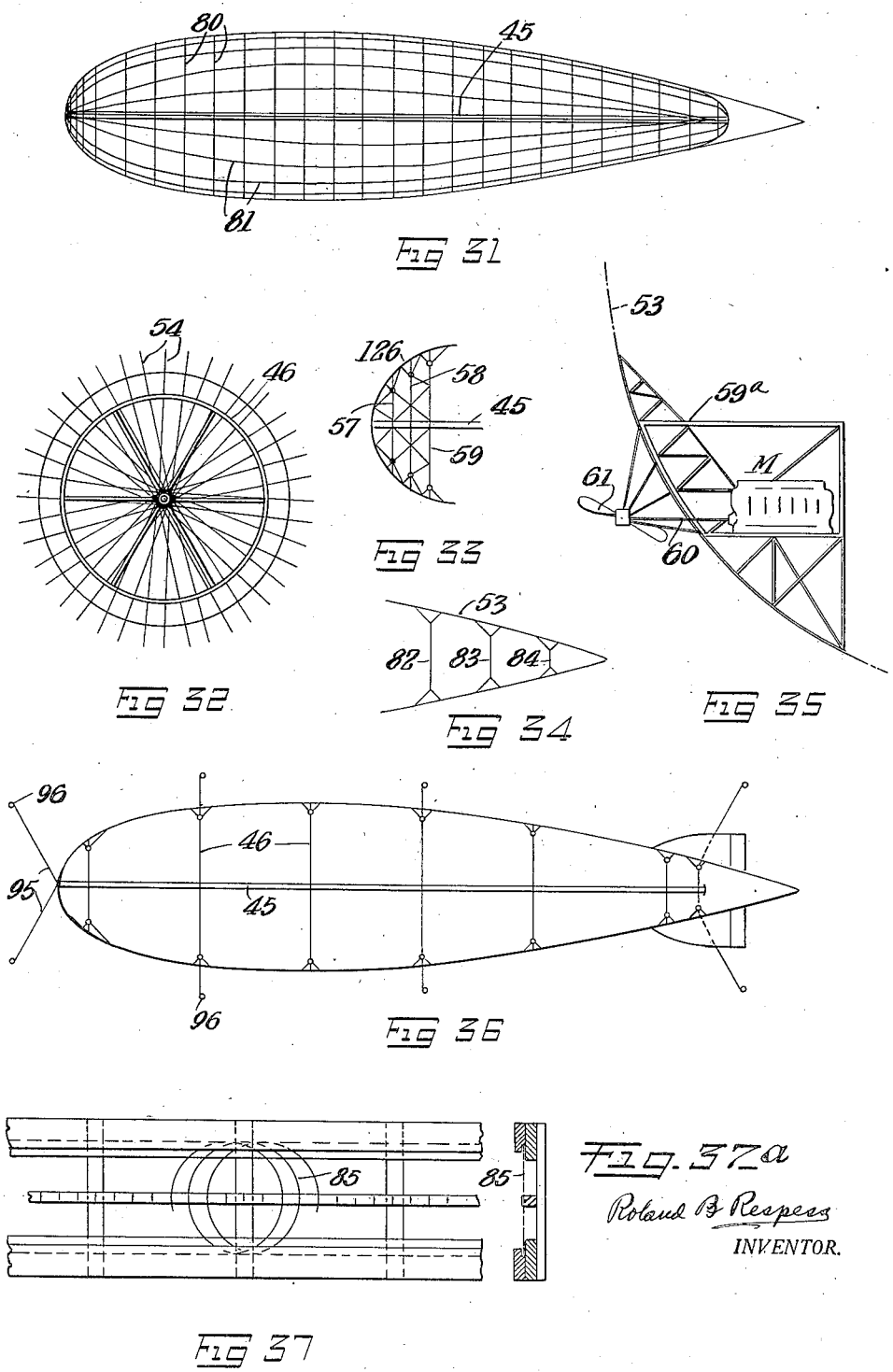

Jan. 26, 1937.                R. B. RESPESS                 2,068,870
                                 DIRIGIBLE
                            Filed April 8, 1932          9 Sheets-Sheet 8
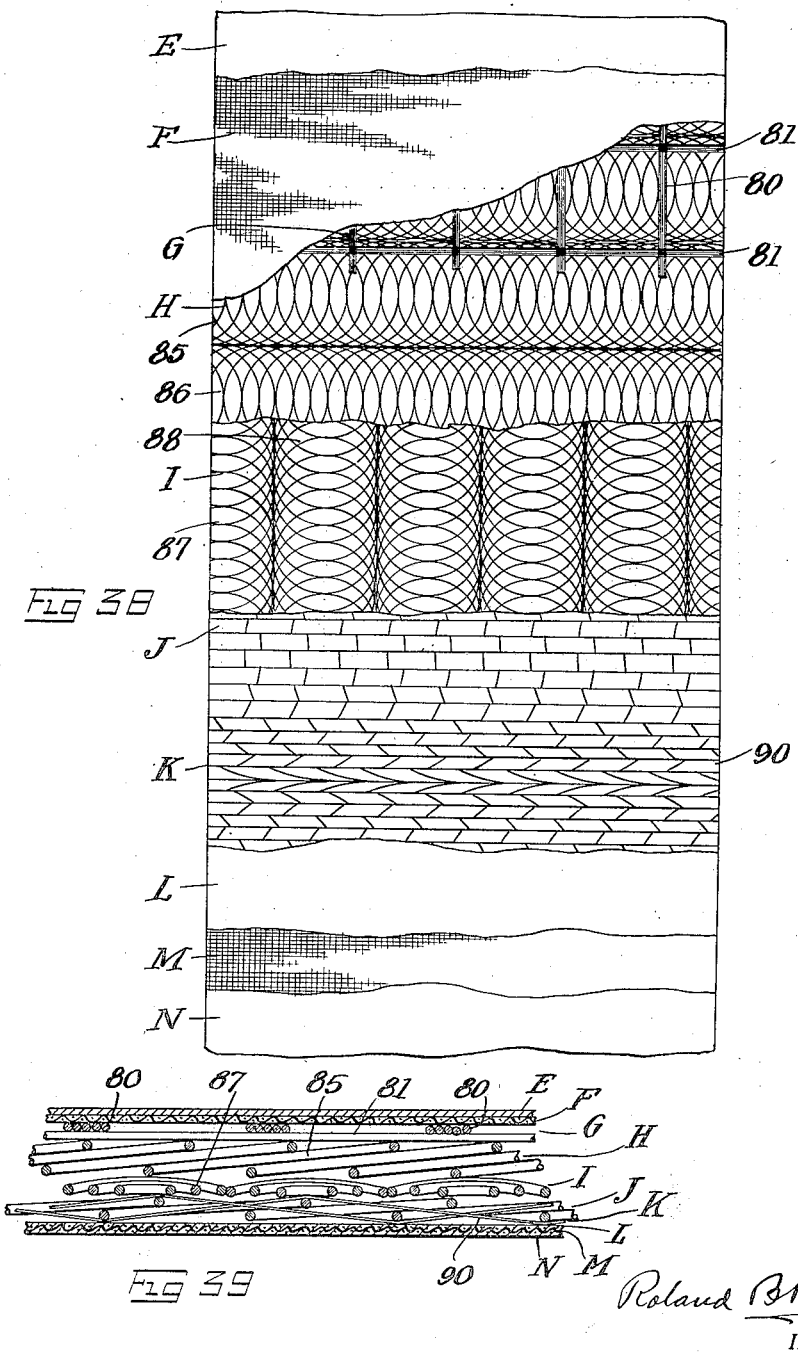

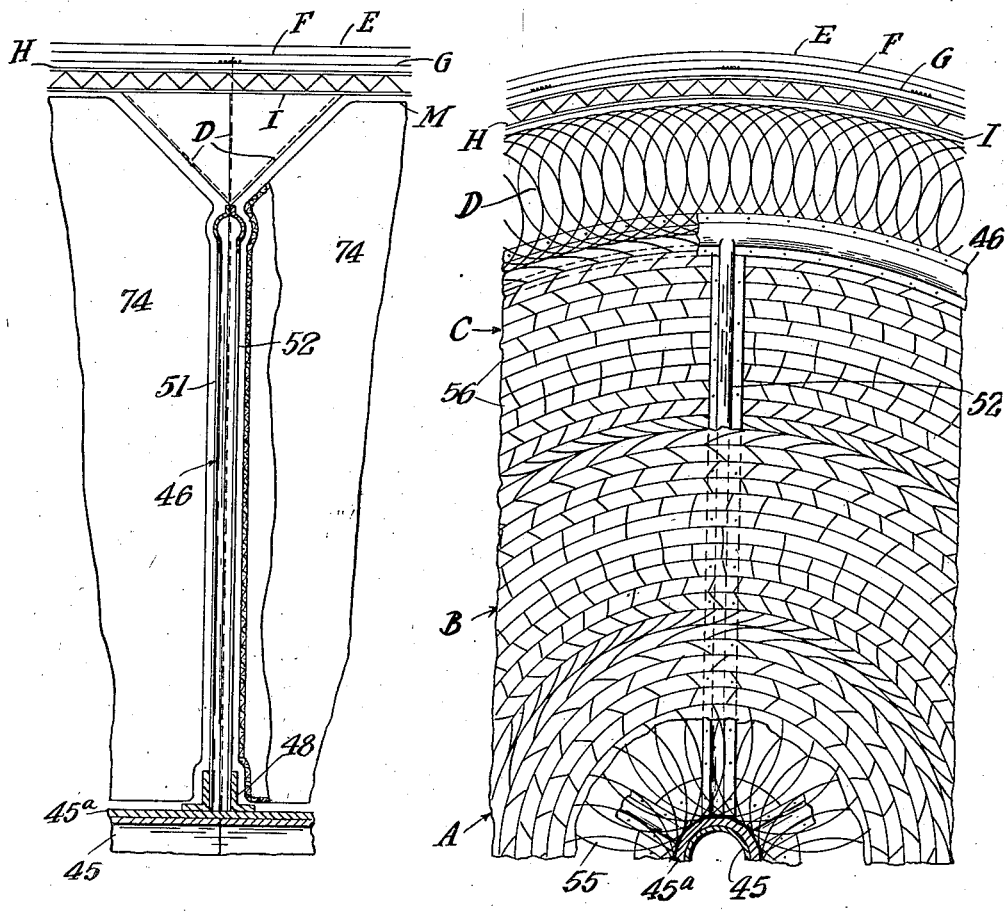

Patented Jan. 26, 1937

2,068,870

UNITED STATES PATENT OFFICE 2,068,870

DIRIGIBLE

Roland B. Respess, Wickford, R. I., assignor to Respess Aeronautical Engineering Corporation, Cranston, R. I., a corporation of Rhode Island Application April 8, 1932, Serial No. 603,945

39 Claims. (Cl. 244—126)

This invention relates to structures particularly adapted for use in dirigibles, aircraft or similar types of construction where great strength and light weight are important.

Structures heretofore utilized in the construction of dirigibles may be briefly outlined as follows:

1. The blimp type formed with three ply rubberized fabric without interior bracing or supporting structure, the shape being maintained by gas enclosed within the fabric. In order that a control cabin and engines may be attached a cord netting may be placed over the rubberized bag or suitable reinforcements of fabric may be employed, from which the cabin and engines are suspended.

2. The semi-rigid type that in its essence is a blimp bag with a fragile metal structure located within the bag. This structure serves to assist in maintaining the shape of the inflated bag and also serves as an additional support for the suspension of the cabin and engines.

3. The frame type generally termed "rigid" which comprises an outer covering of coated fabric stretched over a frame formed of duralumin or aluminum alloys. The frame in a large dirigible comprises several million small sections of metal interfitted and secured together to form beams running lengthwise and circumferentially in the ship. Wires are also employed to connect the beam sections, take up the stresses and add to the strength of the structure. Single ply rubberized fabric bags are positioned within the dirigible and surrounding and separating the bags is a covering of wire mesh fabric or wire and textile strands combined, which are attached to the metal frame work and serve to distribute the lifting pull of the gas in a relatively uniform manner, to the frame, and also to prevent the bags from bulging too greatly. Tension wires connecting opposite sides of the frame are also employed between the bags to assist the frame in resisting a tendency to bulge outwardly.

4. The all metal dirigible is constructed with thin sheets of duralumin combined to form an outer shell which serves as a container for the gas under pressure. Within this shell is also included a rubberized fabric air bag which serves as a control for the gas pressure.

Of the four types of dirigible above outlined the blimp and semi-rigid types are admittedly lacking in commercial value. The sponsors of the rigid and all metal types claim they are practical in construction and operation and therefore possess commercial value.

Of the four types the blimp is the least sensitive to the shock of unusual strains, as of hard landing. For example, in landing the Siemens-Schuckert airship after a flight in which Graf Zeppelin was in the control cabin, the commander stopped his engines too late and the bottom of the forward engine ran into a ditch so that the airship, whose weight was at least 15 tons, arched its back like a cat but righted itself immediately and only slight damage was done, to the forward car.

A stiffened frame airship in such an accident would have received very severe injury as was shown when the "Norge", Amundson's North Pole ship, was wrecked in Alaska, and a frame or "rigid" airship would have fared even worse, as illustrated by the wreck of a Zeppelin at Weilburg, Germany, when the framework was altogether crushed. What might have happened to the all metal airship is problematical but a conclusion may be drawn from the fact its metal skin is only .008 of an inch thick.

It remains to be proved that the rigid airship or all metal ship is sufficiently rugged to serve as carriers of passengers or freight and is capable of maintaining regular schedules regardless of weather conditions, but if this be assumed, such ships are difficult to construct and involve large expenditures for construction and repairs. In order to be practical such a ship should be so designed as to be capable of construction at low cost and within a reasonable short length of time and, furthermore, should be so constructed that it can operate under all weather conditions.

One of the objects of this invention is to provide a structure of the character specified that is rugged and capable of withstanding the stresses and strains to which such structures are subject and furthermore that will be relatively light in weight, so that a considerable increase over the rigid structures will be obtained in air volume displacement per pound of structural weight.

Another object of the invention is to provide a structure of the character specified that is resilient as well as rugged so that it will return to its original shape after being deformed.

Another object of the invention is to provide a dirigible with a shell or envelope that is strong and resilient, the inner surface of the envelope being so constructed and arranged that the gas bags may, if desired, contact directly therewith and coact with the resilient shell to maintain the shell in shape and to return the shell to its original shape after deformation.

Another object of the invention is to provide a dirigible with an envelope or shell so constructed and arranged that, if desired, the gas bags may be spaced out of contact therewith to provide for the passage of air between the bags and the outer shell, the shell being of sufficient strength and resiliency to return to its original shape after deformation without the aid of the pressure derived from direct contact with the gas bags.

Another object of the invention is to provide a dirigible having the various structural parts thereof so arranged and so connected that any pressure or strain on any portion of the dirigible will be transferred and distributed to adjacent and connected sections in such a manner as to absorb and withstand the strains without injury to the parts.

Another object of the invention is to provide a dirigible having the structural elements thereof so constructed, arranged and interconnected as to permit a limited flexing or bending longitudinally thereof without any material deflection of the central portion of the dirigible.

Another object of the invention is to provide a dirigible so constructed and arranged that the parts thereof can be easily and rapidly assembled and which will be relatively inexpensive as to manufacture and maintenance.

Further objects of the invention will appear from the following specification taken in connection with the drawings which form a part of this application and in which Fig. 1 is a vertical sectional elevation of a dirigible constructed in accordance with the invention, showing somewhat diagrammatically and in a skeleton view the arrangement of the transverse bracing members and of the central tubular member extending through the dirigible;

Figure 2:
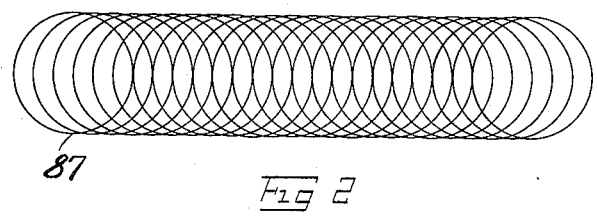
Fig. 2 is an elevational view showing a flattened coil or spiral of wire used for reinforcing the shell.
Figure 3:
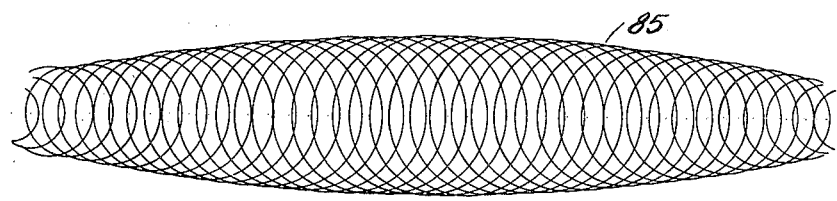
Fig. 3 is a view similar to Fig. 2 but showing another shape of flattened coil utilized as longitudinal reinforcing means for the shell.
Figure 4:
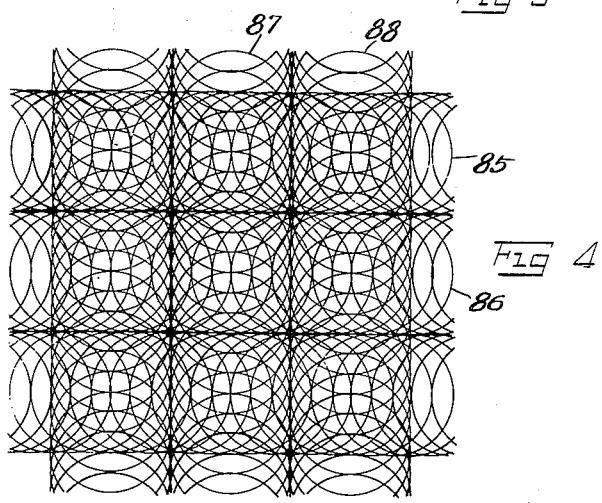
Fig. 4 shows the coils in Figs. 2 and 3 superimposed one on the other.
Figure 6:
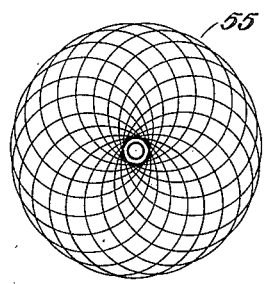
Fig. 6 illustrates a flattened spiral or wire grommet structure utilized in forming the transverse bracing members or for reinforcing the wire structure.
Figure 11:
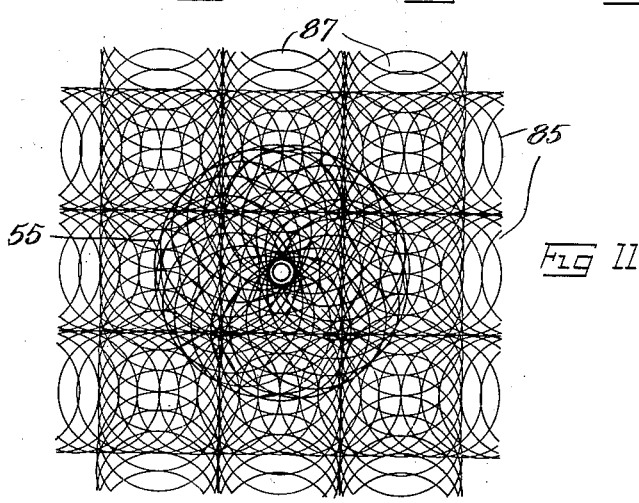
Figure 12:
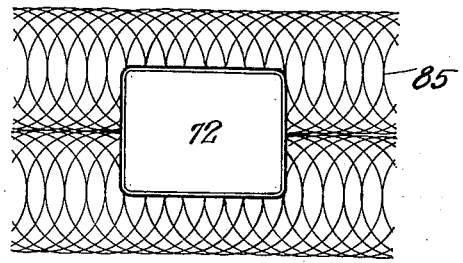
Figure 13:
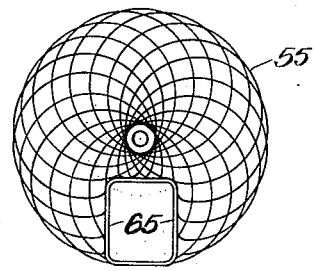
Figure 14:
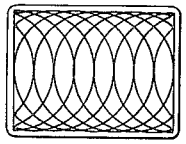
Figure 15:
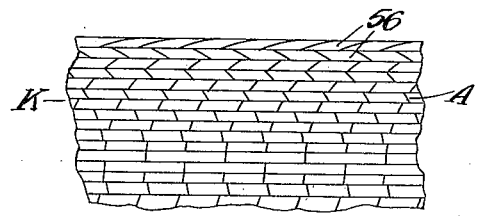
Figure 17:
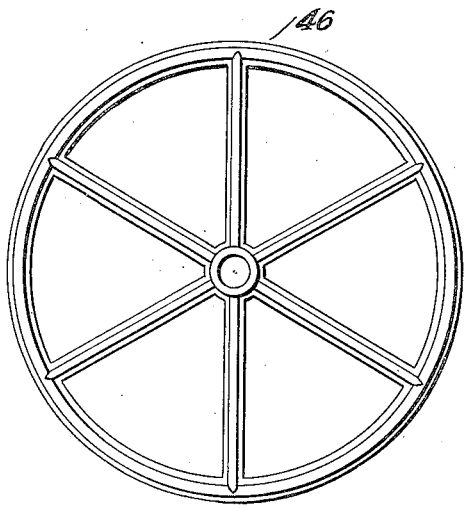
Figure 16:
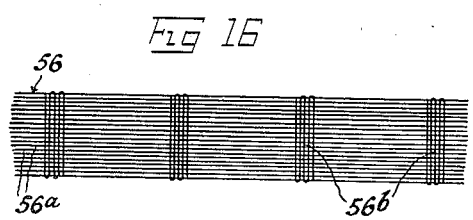
Figure 18:
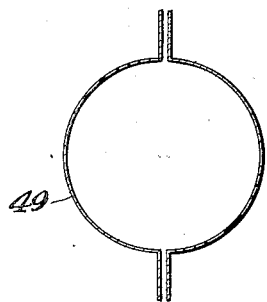
Figure 19:
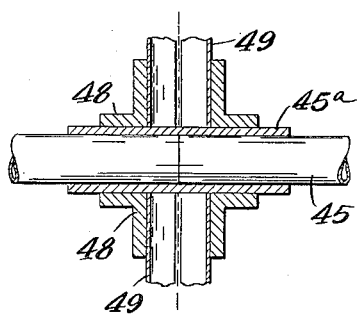
Figure 20:
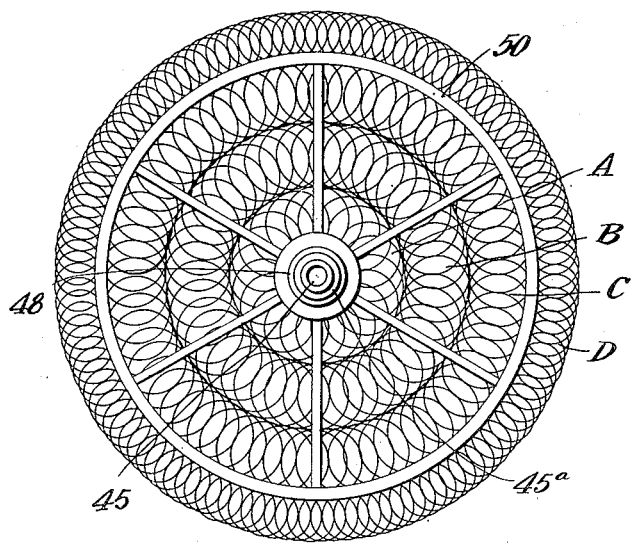
Figure 21:
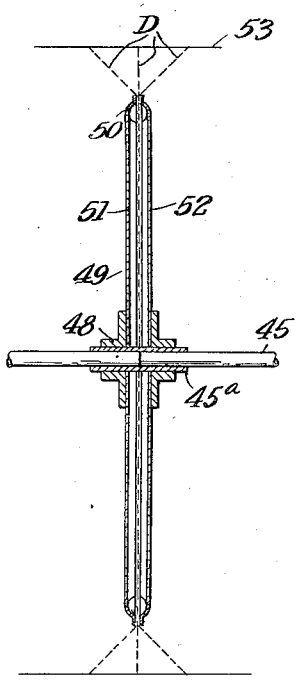
Figure 22:
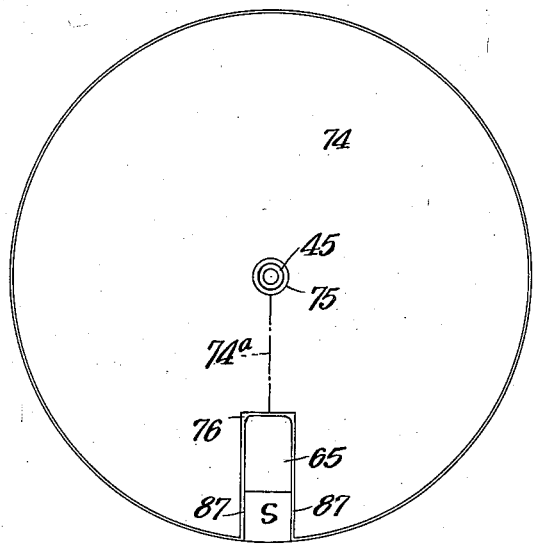
Figure 23:
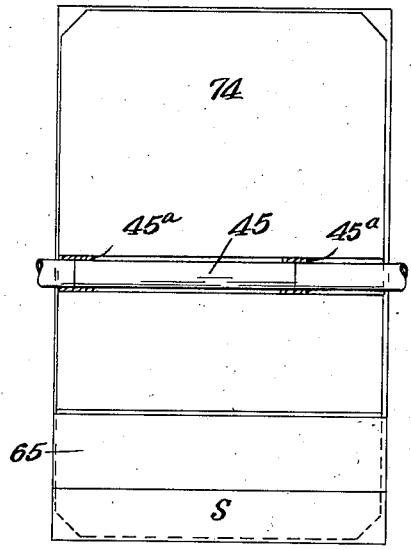
Figure 24:
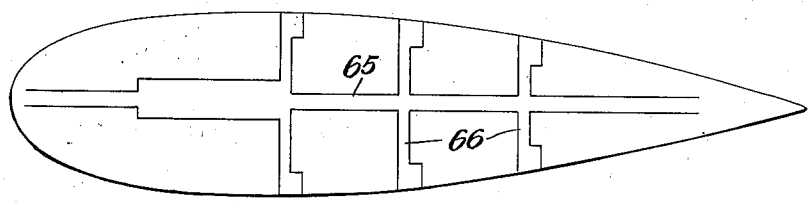
Figure 25:
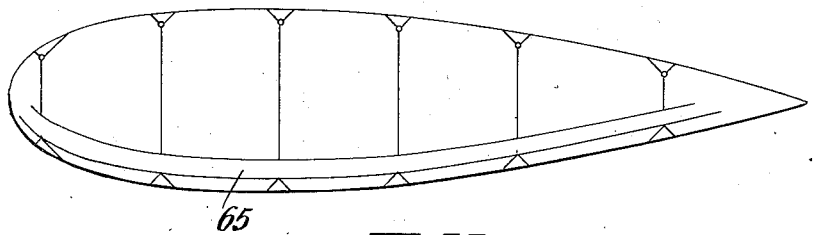

Figs. 7, 8, 9, and 10, are sectional elevations somewhat diagrammatic showing different shapes or sections that may be formed from a wire structure such as that shown in Fig. 6;

Fig. 11 is a view similar to Fig. 4 but showing the wire structure of Fig. 6 superimposed on the wire coils shown in Figs. 2, 3, and 4;

Fig. 12 is an elevational view illustrating how the wire coils such as those shown in Fig. 2 may be constructed around a frame or opening;

Fig. 13 is a sectional elevation similar to Fig. 6 but showing a frame or opening surrounded by the wire structure;

Fig. 14 is an elevational view showing a door frame and the flat wire coil or reinforcing structure;

Fig. 15 is a sectional elevation of the textile fabric utilized in the shell or envelope of the dirigible interwoven through the flattened wire coils or spirals;

Fig. 16 is a broken detail of textile fabric which may be used in the construction of the dirigible envelope, or for interlacing, as in Fig. 15;

Fig. 17 is an elevational view of a frame of one of the transverse bracing members;

Fig. 18 is a sectional view of the circular split rim or spoke structure of the wheel;

Fig. 19 is a sectional elevation of the hub attached to the central tube;

Fig. 20 is an elevational view showing the wheel reinforced with circular wire coils or spirals;

Fig. 21 is a transverse sectional elevation of the wheel shown in Fig. 20;

Fig. 22 is a vertical sectional elevation through one of the gas bags showing the opening forming a passageway longitudinally of the dirigible;

Fig. 23 is a broken sectional elevation taken at right angles to Fig. 22;

Fig. 24 is a longitudinal sectional elevation somewhat diagrammatic showing in plan the passageways in the dirigible;

Fig. 25 is a longitudinal sectional elevation of the dirigible somewhat diagrammatic and showing the longitudinal passageway in the ship;

Fig. 26 is a sectional elevation of a metal cap adapted to be secured to each end of the central longitudinal tube in the dirigible;

Fig. 27 is a somewhat diagrammatic transverse view showing the wheel shown in Fig. 17, this view illustrating particularly the wire cables arranged to support the longitudinal passageway;

Fig. 28 is a sectional elevation of the passageway through the dirigible showing the suspension cables and adjacent parts;

Fig. 29 is a fragmentary elevational view of the material used to form the top and side walls of the passageway;

Fig. 30 shows in top plan and Fig. 30a inside elevation a portion of the flooring used in the passageway;

Fig. 31 is a longitudinal elevation illustrating particularly the longitudinal and transverse wires or cables which surround the flexible envelope;

Fig. 32 is a transverse sectional elevation showing the cables or tension wires in conjunction with one of the transverse bracing members;

Fig. 33 is a sectional elevation showing the reinforcing structure for the end cap or bow of the ship;

Fig. 34 is a longitudinal sectional elevation broken away illustrating the bracing and reinforcing means in the stern of the ship;

Fig. 35 is a sectional elevation illustrating the portion of the frame structure which supports a motor and cooperating parts;

Fig. 36 is a plan view partly in section showing how the dirigible or ship may be anchored or tied to the ground;

Fig. 37 illustrates in broken plan and Fig. 37a in cross section a frame utilized in forming the flat spiral coils;

Fig. 38 is a plan view of a portion of the shell or envelope of the dirigible, successive portions being broken away to illustrate the various superimposed layers of material;

Fig. 39 is a broken sectional view of the construction shown in Fig. 38;

Fig. 40 is a sectional elevation showing a portion of the transverse bracing or reinforcing member and the details of construction thereof; and Fig. 41 is a transverse sectional elevation taken at right angles to Fig. 40.

The invention briefly described consists of a dirigible comprising a central tubular member extending throughout the major portion of the length of the ship, transverse reinforcing members made up of a plurality of resilient elements adapted to yield and to return to their original shape and form and a shell or envelope extending around the transverse members and comprising longitudinally extending and/or circumferentially extending resilient elements and longitudinally extending and/or circumferentially extending cables or wires. In addition to the longitudinal and circumferential resilient elements the envelope or shell may include strips of textile material interwoven with the superimposed layers of resilient elements and outside an envelope composed of a layer or covering of suitably treated woven fabric.

The various parts of the structure are so arranged and so interconnected that the dirigible is strong and rugged in construction and is, furthermore, resilient so that a limited amount of flexing or distortion is permitted, the resiliency of the structure causing any flexed or distorted portion thereof to return to its original shape after the causes for such flexing or distortion have been removed or eliminated.

Further details of the invention will appear from the following description.

Internal structure

The dirigible is provided with a central longitudinally extending tubular member 45 which is shown in Figs. 19, 21, 23, and 40, formed in sections which are detachably coupled together by sleeves 45ª, or in any suitable manner.

Figure 1:
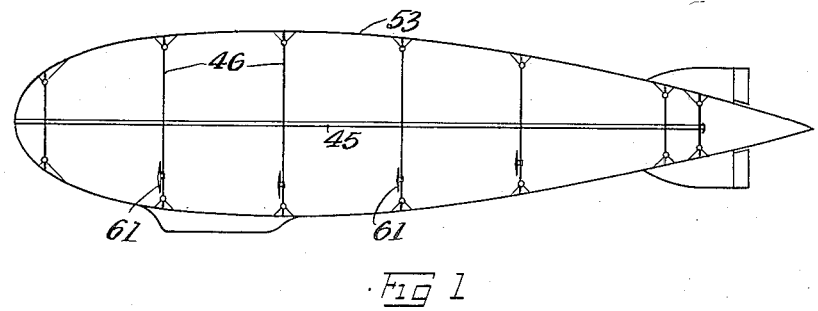

The tubular member 45 has mounted thereon at spaced intervals a plurality of transverse reinforcing members 46, as shown in Figs. 1 and 36, the details of construction of these members being illustrated in Figs. 17 to 21 inclusive, 40 and 41.

Transverse frame members are formed by wheels such as that shown in Fig. 17 having a hub 48, spokes 49 and a rim 50. Each transverse frame member comprises two half sections 51 and 52, as shown in Fig. 21, which are assembled on the tubular member 45. Between the two sections are mounted a plurality of concentric spiral rings A, B, C, and D.

Three outer spiral rings D are provided, as shown in Fig. 21, the central ring being disposed in the plane of the transverse member and the other two rings diverging therefrom. These rings are secured at their outer peripheries to the inner wall of the envelope 53.

Figure 5:
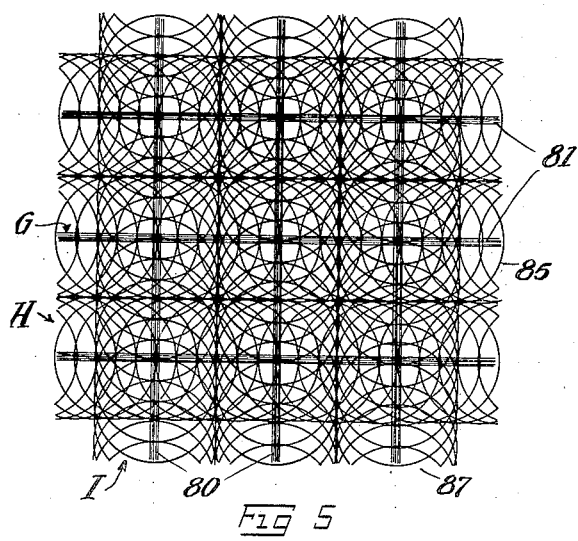
Fig. 5 is a view similar to Fig. 4 but showing wire cables superimposed on the two sets of reinforcing coils.

The transverse members are further connected to the envelope by means of a plurality of diametrically extending wires 54 shown in Fig. 32, these wires extending through the centers of the transverse member and connecting with the transverse and longitudinal cable wires 80 and 81 of Figs. 5 and 31.

If desired, further transverse bracing and reinforcing members may be provided in the form illustrated at 55 in Figs. 6 and 11 and these members may be shaped as desired as shown, for instance, in Figs. 7 to 10 inclusive. The dished or spherical shaped section shown in Fig. 7 may be used at the nose of the ship and the oppositely extending conical shapes may be used to transversely brace the ship intermediate the ends thereof.

The rings A, B, and C may, if desired, be connected by interlacing strips 56 of textile fabric therethrough, as indicated in Figs. 15, 16.

After the sections of the tubular member have been coupled together with the transverse members mounted thereon the double nose cap shown in Fig. 26 may be secured to the front of the tubular member and this cap may be braced internally by transverse members 57, 58, and 59, illustrated in Fig. 33, similar to the structure shown in Figs. 20 and 21.

Fig. 35 illustrates a section of the shell and frame work 59ª disposed therein for supporting one of the motors M having a shaft 60 which is connected in any suitable manner to drive a propeller 61.

The passages extending longitudinally and transversely through the ship are shown in Figs. 24 and 25, the longitudinal passage being shown at 65 and the transverse passages at 66.

The longitudinal passage 65 may be formed of suitable wire mesh material 67, as shown in Fig. 29, and this passage may be hung or suspended on supporting wires 70 and 71 in the manner shown in Fig. 27.

The passages in the ship may extend through the transverse reinforcing members in the manner shown in Fig. 13 by distorting or pressing the wire laterally to make room for the passage without breaking or severing the wire. Fig. 12 shows a passage 72 extending through the reinforcing bands or rings hereinafter described.

The bottom or floor of the passage 65 may be formed in any suitable manner as by frames 73 shown in Figs. 29 and 30 as detachably hooked in place at 73ª.

The gas bags 74 may be constructed in the manner shown in Figs. 22 and 23 with a central opening 75 for receiving the tubular member 45 and with an opening 76 to provide for the longitudinal passage 65.

Outer envelope or shell

The construction of the shell of the dirigible is most important since it is desirable that a limited flexing or distortion thereof be permitted, but the shell should be so constructed and arranged that it will return to its original shape and form after the distorting forces have been removed.

The outer shell or envelope may be composed of a plurality of superimposed layers illustrated particularly in Figs. 38 and 39 wherein successive layers of the material are broken away to expose to view the layers underneath, or one layer of heavier wire in joined hoop sections. In Fig. 38 the layers are designated as E, F, G, H, I, J, K, L, M, and N. The outer layer E is formed of cellulose dope. The next layer F is formed of woven fabric. G is formed of transversely extending wires 80 and longitudinally extending wires 81, the latter being secured at their ends to the front and rear ends of the tubular member or caps attached thereto. The stern of the ship in the rear of the shell is formed in the manner shown in Fig. 34 being reinforced by transverse bracing members 82, 83, and 84.

The next layer H is formed by longitudinally extending wire coils 85, 86, etc., as shown in Fig. 3, these coils being disposed side by side and being interconnected. The coils are flattened and may be formed in a frame such as that shown in Fig. 37 and overlapping portions of adjoining coils may be interconnected.

The next succeeding layer is formed by a plurality of circular rings of flattened wire coils 87, 88, etc., constructed in the manner shown in Fig. 2 and having their longitudinal edges and overlapping portions interconnected. The strips or coils 85, 86, etc. extend longitudinally throughout the length of the ship and are suitably secured at their ends in the bow to the end caps or tubular member 45 and form a point at the stern.

The portion J of Fig. 38 shows the layers H and I superimposed one on the other.

The portion K of Fig. 38 shows strips 90 of textile material interwoven through the layers H and I. The layer M represents the fabric of the gas bag which is preferably coated inside and out, as shown at L and N, with rubber.

The various layers of material just described are also shown in separate detail views in the drawings. For instance, Fig. 5 shows the layers G, H, and I superimposed one on the other. Fig. 11 is generally similar to Fig. 5, but shows a wire reinforcement such as that shown in Fig. 6 superimposed on the structure shown in Fig. 4. Such reinforcements may be used when transverse wires such as shown in Fig. 32 are to be secured to the envelope or shell. Fig. 15 shows the layer K and Figs. 22, 23, and 40 show the section of the fabric gas bag.

Assuming that the composite parts of the dirigible have been constructed as shown in the detail views, the parts are assembled in the following manner:

The first step will be to attach a section of the metal central tube in each of the division sections illustrated in Fig. 20 and Fig. 21, each division section to be correctly located in proper position.

The next step is to assemble the tube sections as a unit, this being accomplished by snug fitting sleeves 45ª over the contacting tube ends, as shown in Fig. 23, in a manner to allow the removal of a section in each gas bag division to thus insert the tube through the gas bag. The assembled tube and the division sections are then suspended above the ground on suitable supports which include provision for the structure to rotate.

The roof and sides of the passage way, lengthwise of the ship, are then placed in their proper positions attached to and between the division sections. Sections of coiled wire 87, as illustrated in Fig. 2, of suitable width to form connections between the lower edges of the side sections of the passageway and the outer flexible structure, are then attached to the sides of the passageway. Thus, a place S for stores, as a keel, is formed under the floor of the passageway the full length of the ship.

The next step is to apply the strips illustrated in Fig. 2. These strips are flat and each is specifically formed for a definite position in the structure. Beginning at the main division section nearest the bow workmen, standing on a platform about the height of the central tube, will take the strip formed for that position and attach one end to the three wire sections projecting from the rim of the division structure, shown in Fig. 21, and by slowly rotating the structure the strip is positioned and attached until it completely circles the division section, with the ends of the strip overlapping and connected.

The next adjacent strip section is placed in position and its edge is connected to the corresponding edge of the strip already in position, and in turn the next strip is placed and the operation is continued until the outer form of the dirigible, between the main division in the bow and the main division in the stern, is completed. Suitable temporary supports between main division sections may be employed if required to assist in the work.

Figures 7, 8, 9, 10:
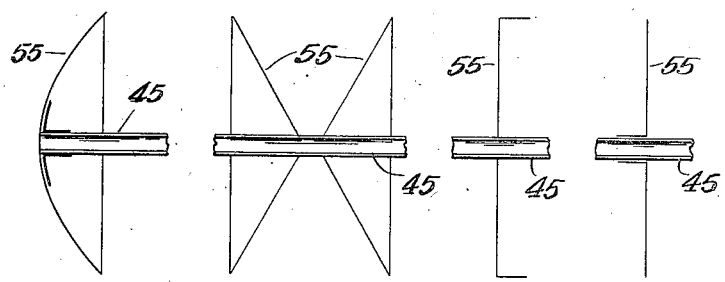

When the sections to contain gas bags are thus formed, the next step would be to build the reinforcing structure to be included in the bow, as shown in Fig. 33, and this structure is enclosed by use of a wire section shaped as a segment of a sphere, as in Fig. 7, and with shaped hoop sections as already employed.

The next step is to form the reinforcing structure of the stern, as shown in Fig. 34, and combine this with a covering formed of wire hoop sections.

The structure is now ready for the application of the tapered strips, as shown in Fig. 3.

Workmen standing on a platform running lengthwise of the ship, just out of contact with its contour, will carefully place the first of the tapered strips in its proper position and attach it to the wire structure already formed. When this strip is in place another similar strip is positioned with its edge in contact with and connected to the first strip and to the wire structure already formed. Thus by rotating the ship on its axis, the places for the remaining strips are in turn brought before the workmen who complete the application of the tapered strips over and connected to the wire structure already formed with the connected hoop shaped sections. The combined wire structure then resembles that shown in section in Fig. 4.

The next step is to interlace narrow textile fabric through the meshes of the combined wire structure, as illustrated in Fig. 15. The purpose of interlacing the wire structure with the fabric strips is to form a more complete union of the longitudinal and transverse sections, and especially to provide a suitable surface with which the gas bag fabric may contact. Thus, the interwoven textile fabric may be located chiefly on the inside of the double wire structure and may present an inner surface composed mainly of textile fabric as indicated in Fig. 15. If desired to save weight in the combined outer structure, textile fabric shown in Fig. 16 may be employed, consisting of a warp of parallel strands 56ª connected at suitable intervals by woven web 56ᵇ. This same kind of special woven fabric strips may also be employed for interlacing with the wire in the main transverse division sections.

The next step is to connect the caps on the ends of the central tube by means of what is termed "hogging" wires or cables 81, shown in Figs. 5 and 31. The wires are preferably grouped and comprise five to ten piano wires formed in a flat section inclosed in a waterproof fabric cover. The cables 81 are attached to the bow cap of the central tube and run longitudinally along the outside of the composite wire and fabric structure, being attached thereto and to the stern cap of the central tube. Similar flat fabric covered wire cables 80 would be formed as circular bands positioned around the dirigible, over the hogging cables, and these cables will be attached to the composite wire and fabric structure and to the hogging cables at their crossing points.

The ends of the wires 54 shown in Fig. 32 may project through the composite wire and textile outer structure at points where the hogging cables and the circular cables cross at transverse division sections 46. These tension wires are bent over the cables and their ends pushed back through the composite outer structure and attached inside, possibly to the rim of the wheel section of the main divisions.

The structure is now ready for the cabin, fins and skin fabric. It is to be understood suitable reinforcement will be incorporated in the structure to provide attachment of the cabin and fins. The cabin and fins may be built separately of strong flexible wire structure and rigid members as employed in building the main structure and thereafter be attached to the main structure, or, if desired, the cabin may be shaped as an extension or deformation of the main structure.

The outer fabric cover F, to contact with the flexible wire and interwoven structure is formed and stretched in position as in its application to rigid dirigibles, and the waterproof cellulose shrinking "dope" E is thereafter applied.

The dirigible is then ready for installation of its gas and water tanks, piping, electric wiring, control wiring, anchor lines, stores, etc., as well as its power equipment and propellers.

The installation and operation of motors in this type of dirigible present some new features inasmuch as it may be preferable that the motor base, the motor and its propeller form a rigid unit in combination with each other. Fig. 35 shows how such a rigid component may be formed and applied within the flexible outer structure, with reinforcement and cable suspension, so that the rigid component may operate without distortion between its parts, yet be attached in a manner to provide a resilient coacting relation between the rigid unit and the other components of the dirigible.

The central tube of a dirigible of this type may be employed as a conduit for flexible cables that may extend through the end caps and through openings in the tube at the attachment of the main division sections. A number of these cables may be employed as illustrated at 95 in Fig. 36. One end of the cable may have an eye 96 or hook attached, while the other end may be attached to small winches placed within the control cabin or ship. At regular landing points suitable anchors may be set in the ground, to which the cables may be connected, or if such anchors are not provided iron spikes can be carried and they may be let down to the ground with a member of the crew and the spikes be driven in the ground to serve as temporary anchors.

In operation, the dirigible may land on the ground and the cables be let out and attached to the anchors and the cables be drawn taut by the winches, or in a high wind the dirigible may settle near the ground, let out the cables so their ends may be connected to the anchors, then the ship may slowly settle to the ground while the slack in the cables are taken up by the winches. Suitable wheel supports, not shown, should be provided to support the ship on the ground.

Reference has already been made to the gas bags. In the dirigible outlined in Fig. 1 a place is made for five gas bags and a bow section and a stern section in which there are no gas bags. The gas bags are made of rubberized fabric designed to fit snugly in the spaces allotted to each, as illustrated in Figs. 22 and 23.

The gas bags are installed after the dirigible is finished. To place a gas bag in position doorways are formed in the flexible outer structure, as illustrated in Fig. 12, and doors as illustrated in Fig. 14, are placed to close such openings. In Fig. 14 only one layer of formed wire is shown but it is to be understood the doors will include two layers of spiral formed wire, as in Fig. 4, and the two layers are interlaced with narrow fabric, with an outer covering of textile fabric treated with cellulose dope. Windows of glass or celluloid may also be provided as required.

When the folded gas bag is placed within the dirigible a section of the central steel tube is taken out and placed through the hole in the gas bag, then the section of tube is placed back in position. The bag may then be unfolded to position and the inlet and outlet valves connected. The structure is arranged to snugly fit around the gas bags when they are inflated, thus the lifting force of the gas acts directly on the flexible outer structure and also coacts with such structure to resist inward pressure.

If, however, it should be desired to provide circulation of air between the flexible outer cover and the gas bags this may be achieved by employing wire mesh fabric spaced away from the outer structure but connected thereto by rigid or semi-rigid elements.

For the installation of engines, doors are also provided in the outer structure so the engines may be installed and removed without difficulty. Reinforcement, as illustrated in Fig. 6, may be applied as in Fig. 11 to the outer structure as required, or to the main division sections, cabin or fins.

From the foregoing description it will be seen that a simple, practical dirigible structure has been designed and that the structure will be rugged but at the same time resilient so that it can withstand the stresses and strains to which ships of this character are subjected. Furthermore, by reason of the resilient reinforcements in the shell envelope the shell will return to its original shape after deformation or distortion and stresses and strains on any portion will be transferred and distributed to adjacent and connected sections in such a manner that such strains will be absorbed and withstood without injury to the parts. In addition to these advantages it will be evident that the structure described will be relatively light in weight so that a considerable increase over the rigid type of dirigible will be obtained in air volume displacement per pound of structural weight.

The spiral spring strips forming the foundation of the shell structure may be laid on diagonally or spirally as well as circumferentially and longitudinally and can be readily "molded" in all directions to the exact contour of the envelope. Because of such structure, hatchways and ports may be readily formed wherever required by bending apart the coils, without severing them and fastening them in such bent back shape by means of suitable framing, as in Figs. 12 and 13. While the gas bags have been described as complete circumferentially with openings through the centers, thus requiring removal of the spar sections for removal or replacement of the bags, it is contemplated that the bags may be split inward to the center opening as indicated at 74ª in Fig. 22, so that they may be folded about the central spar, the separated portions being afterwards laced or otherwise connected together, if considered desirable. The spar forming the central backbone of the ship need not be strictly tubular, though that is a desirable form, but may be of latticework design or the like. This spar is braced by the transverse sections or bulkheads and by the longitudinally extending members connecting these partitions or bulkheads together and to the opposite ends of the spar. Thus, the spar is reinforced by longitudinal tensioning forces and given greatly increased strength and stiffness. It thus forms a substantially rigid center, unyielding to ordinary shocks against the shell of the ship, but adapted under extreme conditions to yield sufficiently to prevent permanent injury to the ship structure.

Springy reinforcements of the coiled wires, such as shown in Fig. 6, flattened or in such shapes as indicated in Figs. 7, 8, 9, and 10 may be attached as "overlays" or "underlays" to the coiled wire fabric structure in the manner indicated in Fig. 11, wherever reinforcement may be necessary, such as for attachment of the motor units, indicated in Fig. 35 or for the running of the anchorage cables as in Fig. 36, the attachment of the fins, cabins or cabin fixtures, etc. The relative rigidity and resiliency afforded by the coiled wire structure may be controlled to a large extent by the number and arrangement of connections between successive, adjacent or adjoining coils in the same strip or in adjoining strips. Wires or cables may be run along the edges of the coil strips illustrated in Figs. 2 and 3, such edge reinforcements then providing ready means by which adjacent strips may be secured together in edge-to-edge relation as by means of tie wires or clips connecting such edge reinforcements of the adjoining coil strips.

Although one specific embodiment of the invention has been particularly shown and described, it will be understood that the invention is capable of modification and that changes in the construction and in the arrangement of the various cooperating parts may be made without departing from the spirit or scope of the invention, as expressed in the following claims.

What I claim is:—

1. In a dirigible, an envelope or covering having incorporated therein and forming a part thereof resilient means comprising superimposed spring coils for retaining the shape of the envelope and returning the envelope to its original shape after flexure or distortion.

2. In a dirigible, an envelope or covering having incorporated therein and forming a part thereof longitudinally and circumferentially resilient means comprising overlapping spring coils for retaining the shape of the envelope and returning the envelope to its original shape after flexure or distortion.

3. In a dirigible, an envelope or covering having incorporated therein and forming a part thereof longitudinally and circumferentially resilient wire members formed of spring coils for retaining the shape of the envelope and returning the envelope to its original shape after flexure or distortion.

4. In a dirigible, an envelope or covering having incorporated therein and forming a part thereof longitudinally and circumferentially resilient wire coils for retaining the shape of the envelope and returning the envelope to its original shape after flexure or distortion, said elements extending substantially throughout the length and circumference of said envelope.

5. In a dirigible, an envelope or covering having incorporated therein a plurality of circular resilient bands, arranged edge to edge and connected to each other, said bands consisting of flattened spring coils.

6. In a dirigible, an envelope or covering having incorporated therein a plurality of longitudinally extending interconnected resilient strips, each strip consisting of a flattened spring coil.

7. In a dirigible, an envelope or covering having incorporated therein a plurality of circular resilient bands, arranged edge to edge and connected to each other, and a plurality of longitudinally extending interconnected resilient strips, said bands consisting of flattened spring coils.

8. A dirigible comprising a central tubular member and a plurality of spaced transverse members mounted thereon, annular resilient means connected to and located around the peripheries of said members, and an envelope surrounding said members and connected to said resilient means.

9. In a dirigible, an envelope having incorporated therein a plurality of superimposed layers of resilient flexure and torsion resisting material, certain of said layers consisting of flat wire coils.

10. In a dirigible, an envelope having incorporated therein a plurality of superimposed layers of interconnected resilient flexure and torsion resisting material, certain of said layers consisting of flat wire coils.

11. In a dirigible, an envelope having incorporated therein a plurality of superimposed layers of resilient flexure and torsion resisting material, said layers comprising overlapping coils of spring material and textile material interwoven in said layers through the coils of said spring material.

12. In a dirigible, an envelope or covering having incorporated therein longitudinally and circumferentially resilient strips consisting of flat wire coils for retaining the shape of the envelope and returning the envelope to its original shape after flexure or distortion.

13. In a dirigible, an envelope or covering having incorporated therein longitudinally and circumferentially resilient members formed of flat wire coils for retaining the shape of the envelope and returning the envelope to its original shape after flexure or distortion.

14. In a dirigible, an envelope having incorporated therein a plurality of layers of interconnected resilient strips formed of flattened wire coils.

15. In a dirigible, an envelope having reinforcing means comprising edge connected circular bands of overlapping circularly bent spring wires in transverse direction and edge connected tapered strips of overlapping circularly bent springy wires in longitudinal direction.

16. In combination with the frame of a dirigible, a resilient shell yieldingly connected with said frame and comprising strips of continuously connected coils of spring wire conforming to the shape defined by the frame of the dirigible, said strips being disposed in adjoining relation and coils of adjoining strips being connected to transmit and dissipate shock and to render the shell resilient substantially throughout.

17. In combination with the frame of a dirigible, a resilient shell over said frame, said shell comprising circumferentially extending bands and longitudinally extending strips connected with the frame and composed of successively connected coils of springy wire conforming to the outline defined by the dirigible frame and coils of said bands and strips being connected to transmit and dissipate shocks and strains in all directions and to render said shell completely resilient.

18. A shell structure for aircraft, comprising interconnected strips of successively connected coils of spring wire and certain of said coils being deformed and secured in a spread-apart relation defining a permanent port or passageway in the shell structure.

19. A dirigible comprising a central spar and spaced transverse frames thereon, composed in part of successively connected coils of spring wire and a shell structure composed in part of strips of successively connected coils of spring wire connected together and to said coils of the transverse frames.

20. A dirigible comprising a generally central spar and cross-frames forming together the frame of the dirigible, a shell structure over said frame and containing strips of successively connected coils of wire and cables connected with said strips and with said spar.

21. A shell structure for aircraft, comprising inner and outer fabric layers and intermediate layers of coiled wire with connected angularly related wire cables.

22. In a dirigible, an envelope or covering having incorporated therein a plurality of circumferential metallic strips of wire coils for retaining the shape of the envelope and returning the envelope to its original shape after distortion.

23. In a dirigible, an envelope or covering having incorporated therein a plurality of circumferential metallic strips of flat wire coils for retaining the shape of the envelope and returning the envelope to its original shape after distortion.

24. In a dirigible, an envelope or covering having incorporated therein a plurality of interconnected circumferential metallic strips of flat wire coils for retaining the shape of the envelope and returning the envelope to its original shape after distortion.

25. In a dirigible, an envelope or covering having incorporated therein a plurality of longitudinal metallic strips of wire coils for retaining the shape of the envelope and returning the envelope to its original shape after distortion.

26. In a dirigible, an envelope or covering having incorporated therein a plurality of interconnected longitudinal metallic strips of flat wire coils for retaining the shape of the envelope and returning the envelope to its original shape after distortion.

27. A dirigible comprising a central shaft and a plurality of spaced transverse circular members mounted thereon, annular resilient coils surrounding said circular members and connected thereto and an envelope surrounding and connected to said annular coils.

28. In a dirigible, an envelope having incorporated therein a plurality of superimposed layers of flat wire coils and textile material interwoven in said coils.

29. In a dirigible, an envelope having incorporated therein a plurality of superimposed layers of flat wire coils extending longitudinally and circumferentially of the dirigible and textile material interwoven in said coils.

30. A dirigible comprising a central spar and cross frames forming together the frame work of the dirigible, an envelope having incorporated therein and forming a part thereof longitudinally extending spring strips of overlapping wire coils and cables connected with said strips and with said spar.

31. A dirigible comprising a central spar and cross frames forming together the frame work of the dirigible, an envelope having incorporated therein and forming a part thereof longitudinally and circumferentially extending spring strips of overlapping wire coils and cables connected with said strips and with said spar.

32. A dirigible comprising a central spar and cross frames forming together the frame work of the dirigible, an envelope having incorporated therein and forming a part thereof longitudinally extending spring strips of overlapping wire coils and cables in said cross frame members connected with said strips and with said spar.

33. A dirigible comprising a central spar and cross frames forming together the frame work of the dirigible, an envelope having incorporated therein and forming a part thereof longitudinally extending spring strips of overlapping wire coils and cables connected with said strips and with said spar and extending through said envelope for use in anchoring the dirigible.

34. A dirigible comprising a central spar and cross frames forming together the frame work of the dirigible, an envelope having incorporated therein and forming a part thereof spring strips of overlapping wire coils and cables connected with said strips and with said spar and extending through said envelope for use in anchoring the dirigible.

35. A dirigible comprising a central spar and cross frames forming together the frame work of the dirigible, an envelope having incorporated therein and forming a part thereof longitudinally and circumferentially extending spring strips of overlapping wire coils and cables connected with said strips and with said spar and extending through said envelope for use in anchoring the dirigible.

36. A dirigible comprising a frame including spaced transverse members, annular resilient envelope supporting means about the peripheries of said transverse frame members and a flexible envelope surrounding and supported by said annular resilient means.

37. A dirigible comprising a frame including spaced transverse members, annular resilient envelope supporting means about the peripheries of said transverse frame members, a flexible envelope surrounding and supported by said annular resilient means and cables confining said resilient envelope supporting means and extending lengthwise of the frame.

38. A dirigible envelope including overlapping wire coils secured in overlapping relation and a reinforcing "overlay" of overlapping wire coils secured in overlying relation to the overlapped coils of the envelope.

39. A dirigible comprising a central spar, spaced transverse frames thereon, wire members extending over said transverse frames and secured in closely spaced relation forming a shell structure and frames for forming passageways in said hull structure, said wire members being spread apart at the desired locations of said passageways and said passageway frames being set in said spread apart portions of said wire members and thereby defining permanent ports or passageways in the shell structure.

ROLAND B. RESPESS.